July 31, 1956    E. R. BUCHWALD ET AL    2,756,898
TANK CONSTRUCTION FOR VOLATILE LIQUIDS
Filed Feb. 23, 1954

INVENTORS
ERWIN R. BUCHWALD AND
JOHN L. PETERSEN
BY Oberlin + Limbach
ATTORNEYS.

United States Patent Office 2,756,898
Patented July 31, 1956

2,756,898

TANK CONSTRUCTION FOR VOLATILE LIQUIDS

Erwin R. Buchwald, Independence, and John L. Petersen, Euclid, Ohio, assignors to The Standard Oil Company, Cleveland, Ohio, a corporation of Ohio Application February 23, 1954, Serial No. 411,662

2 Claims. (Cl. 220—86)

Where volatile liquids, such for example as gasoline, naphthas, etc., are loaded into transporting tanks, very large evaporation tends to occur under ordinary conditions. Thus, where such a volatile liquid is loaded into a tank truck by filling through the ordinary top hatch, the liquid on striking the bottom of the tank compartment turbulently rises, with more or less spray formation, and excessive evaporation loss occurs. Even if the loading be by introducing the liquid through a bottom inlet, the fountain effect which results throws up spray, and the splashing and spray formation and mist that forms occasion evaporation losses which on careful checking are found to be very serious. Some attempts at mitigating evaporation loss in loading have been directed along the lines of providing a special inlet pipe which leads from the top of the tank down to the floor, either to discharge directly thereagainst, or discharge through an extension pipe section extending along the floor and having lateral openings which are directed toward the sloping side walls. With these however, while the direct fountain effect in the direct spouting up of liquid is avoided, there is no control of the turbulence and foaming and spray throw-up as the liquid rushes up the sloping side walls of the tank. By the present invention, turbulence in tank loading is controlled both as against direct fountain effect, and as to the foaming up incurred by liquid rushing up the sloping lateral walls. A very material control of evaporation losses otherwise inevitable is thus now made available. Other features and advantages of the invention will appear from the following description.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
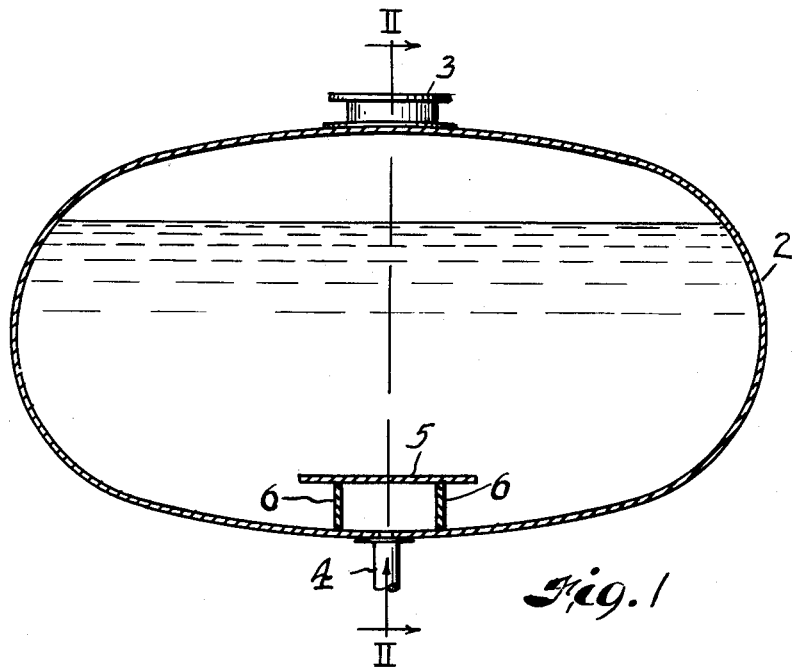
Figure 2:
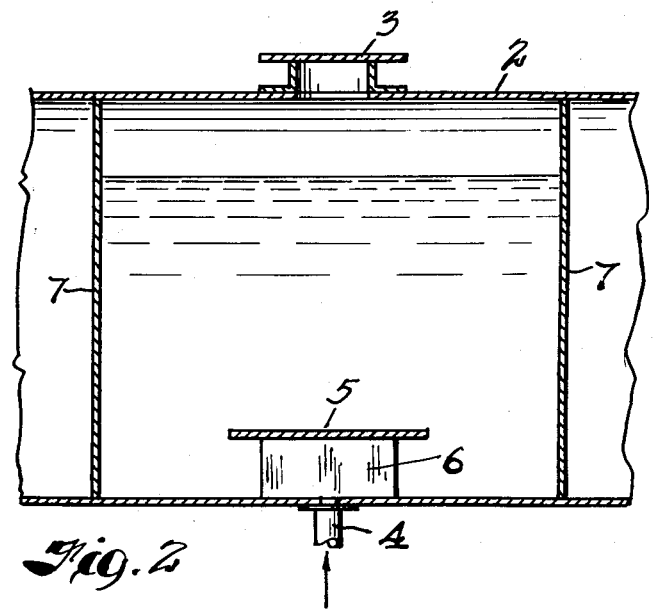

In said annexed drawing:

Fig. 1 is a transverse sectional view through a tank truck compartment embodying the invention; and Fig. 2 is a section thereof taken on line II—II, Fig. 1.

In highly volatile liquids, as gasoline, certain chemicals, etc., evaporation losses in loading involve a loss of vapors remaining in the tank from the previous load, and the vapors that originate from the spray and mist formed while loading. This mist is very finely divided, and readily evaporates and gives a serious increase in the vapor leaving the tank. The spray formation results from the fountain of liquid that gushes up from the bottom of the tank and fans out, particularly to and up the side walls of the compartment. In the present construction however, direct fountaining of liquid from the bottom is prevented, and turbulent lateral discharge up the sloping side walls of the tank is prevented, and the inlet of liquid is controlled to quiescent generally linear flow horizontally toward the two ends of the tank. As shown in the drawing, the invention is illustrated by a tank truck compartment 2, which has a top hatch 3 and a bottom connection 4 which serves both as inlet and outlet for the liquid. Spaced over the connection 4 is a horizontal baffle plate 5. This is supported by side walls 6 which close off access laterally and prevent liquid from flowing up the sloping side walls of the tank, by providing openings directed toward both vertical end walls 7 of the tank compartment. As seen from this, the stream of in-flowing liquid through the connection 4 is completely circumscribed such that it cannot fountain directly up, nor can it flow laterally on the tank's side walls, but is compelled to distribute toward both end walls.

As readily seen, the usage of the device involves connecting up the loading line to the bottom connection 4 and admitting the liquid therefrom to escape in the tank toward both end walls, but being prevented from movement directly up or laterally on the sloping side walls. Fountaining action and turbulence and foam is thus controlled, and with savings in evaporation losses which are very substantial. For instance, tests in a tanker compartment having construction as described, such that the incoming liquid was directed toward the square ends instead of upwardly or toward the rounded sides was found to reduce losses where the loading rate was 650 gallons per minute of 10 pound vapor pressure gasoline showed evaporation loss of only 0.05 percent, the temperature of the gasoline being 70° F. On the other hand, in equipment which did not have the baffle means over bottom inlet feed, the evaporation loss averaged 0.17 percent, for the same loading rate and type of gasoline stock. That is, whereas customary loss is at the rate of 1.70 gallons per thousand, the present invention lowers such loss to 0.50 gallon per thousand, a reduction to less than $\frac{1}{3}$ otherwise incurred.

Other modes of applying the principle of the invention may be employed, change being made as regards the details described, provided the features stated in any of the following claims or the equivalent of such be employed.

We therefore particularly point out and distinctly claim as our invention:

1. In construction of the character described, a tank for volatile liquids, having vertical end walls and upwardly sloping side walls and including the combination of a top closure, an outlet and inlet opening at the bottom, a horizontal baffle plate spaced over said outlet and inlet opening, and support means for the baffle plate open toward the tank end walls and closed toward the side walls.

2. In construction of the character described, a tank for volatile liquids, having vertical end walls and upwardly sloping side walls and including an outlet and inlet opening at the bottom, and baffle means spaced over said outlet and inlet, said baffle means being open toward the end walls of the tank and closed in other directions.

References Cited in the file of this patent

UNITED STATES PATENTS

| 1,424,037 | Rudolph | July 24, 1922 |
| 1,906,996 | Moxey | May 2, 1933 |
| 1,949,981 | Stendrup | Mar. 6, 1934 |